United States Patent
Kölhi et al.

(10) Patent No.: US 12,501,104 B2
(45) Date of Patent: Dec. 16, 2025

(54) SYSTEMS AND METHODS FOR LEVERAGING MACHINE LEARNING FOR IMPROVING AND ENHANCING DVR SERVICES

(71) Applicant: Adeia Guides Inc., San Jose, CA (US)

(72) Inventors: Johan Kölhi, Vaxholm (SE); Anthony Friede, Upplands Väsby (SE); Reda Harb, Issaquah, WA (US)

(73) Assignee: Adeia Guides Inc., San Jose, CA (US)

( * ) Notice: Subject to any disclaimer, the term of this patent is extended or adjusted under 35 U.S.C. 154(b) by 60 days.

(21) Appl. No.: 18/103,043

(22) Filed: Jan. 30, 2023

(65) Prior Publication Data
US 2024/0259629 A1    Aug. 1, 2024

(51) Int. Cl.
*H04N 21/433* (2011.01)
*G06V 10/764* (2022.01)
*H04N 21/44* (2011.01)
*H04N 21/472* (2011.01)

(52) U.S. Cl.
CPC ....... *H04N 21/4334* (2013.01); *G06V 10/764* (2022.01); *H04N 21/44004* (2013.01); *H04N 21/47217* (2013.01); *G06V 2201/07* (2022.01)

(58) Field of Classification Search
None
See application file for complete search history.

(56) References Cited

U.S. PATENT DOCUMENTS

| | | | |
|---|---|---|---|
| 9,138,652 B1* | 9/2015 | Thompson | H04N 21/237 |
| 11,272,248 B2 | 3/2022 | Neumeier et al. | |
| 2009/0018920 A1 | 1/2009 | Lerman et al. | |
| 2009/0080857 A1* | 3/2009 | St. John-Larkin | H04N 21/44016 386/326 |
| 2011/0251896 A1 | 10/2011 | Impollonia et al. | |
| 2016/0203843 A1* | 7/2016 | Beals | G11B 31/006 386/230 |
| 2020/0413113 A1* | 12/2020 | Tofighbakhsh | H04N 21/25891 |
| 2022/0101452 A1 | 3/2022 | Systrom et al. | |

* cited by examiner

*Primary Examiner* — Heather R Jones
(74) *Attorney, Agent, or Firm* — HALEY GUILIANO LLP

(57) ABSTRACT

A media stream is accessed, and a classification model is selected for identifying objects in the media stream. Using the classification model, it is determined whether a content item of interest to the user is currently being received in the media stream. If the content item is currently being received in the media stream, at least a portion of the content item is recorded from the media stream. If the content item is not currently being received, then recording is paused or delayed until it is determined that the content item is being received.

14 Claims, 8 Drawing Sheets

SYSTEMS AND METHODS FOR LEVERAGING MACHINE LEARNING FOR IMPROVING AND ENHANCING DVR SERVICES

BACKGROUND

This disclosure is directed to media recording and storage. In particular, techniques are disclosed for leveraging machine learning to improve and enhance digital video recorder (DVR) services based on objects identified in a media stream.

SUMMARY

This disclosure provides new methods for extending current DVR capabilities by using artificial intelligence (AI)/machine learning (IL) classifiers to detect and act upon the actual content of the video streams themselves, rather than relying primarily upon the information published within the available electronic program guides (EPGs). One such capability is automatically detecting the initiation, cessation or continuation of games, events and other programming which occur beyond the information contained within the device's existing EPG information and modifying or extending recording times accordingly.

Another capability is recording only portions of video streams/broadcasts of interest to the user (beyond the information available in EPG databases). Proactively recording content for end users based on the contents of the video streams themselves may be yet another new capability, as well as analyzing previously viewed content in order to proactively detect and add programming to DVR-generated wish lists which are highly relevant and likely to be of significant interest to each individual user.

"Intelligent Seek" capabilities may be introduced, whereby end-users could request to seek forwards or backwards within the video stream until the requested conditions are met. For example, the user may enter a request "show me the next time Wayne Rooney re-enters the football game," or "fast-forward to the end of the rain delay." A seek function can then be executed to a point in the video stream that matches the request. "Intelligent bookmarking" capabilities may also be introduced, whereby the DVR could proactively analyze stored and ongoing video streams in order to identify likely moments of interest for each active user of the platform, based on all known information regarding each user's current interests and past behaviors (e.g., "Golden Buzzer moments", or "High-Action moments based on crowd response" during sporting events).

It is well known that sporting events and other live broadcasts sometimes deviate from their scheduled start and end times, often with little or no notice to and from the event's broadcasters, resulting in inaccurate electronic programming guides (EPG) and inaccurate/incomplete recordings. Dynamically updated EPG guides are an improvement which help by changing the end of recording time for a DVR but updating these services with exact times for live sporting events is difficult to predict if a game becomes rain delayed or extended.

This disclosure solves these problems by using ML classification of the stream's contents, including but not limited to classification of event-specific video and audio content as well as of broadcast-specific graphical elements and the various forms of each event's/broadcaster's sonic branding. Different broadcasters and streaming video channel providers will additionally benefit from having unique ML models trained for their specific content which is also covered by this disclosure.

The AI/ML capabilities and new metadata streams described herein make possible novel improvements toward the creation of more accurate and personalized DVR controls, programming suggestions and automated per-user content-based and interest-based viewing wish lists. This could be achieved, for example, by combining an analysis of each individual user's previously viewed content with all other available behavioral, demographic, and area-of-interest data in order to more accurately detect and proactively present highly relevant programming suggestions, to create intelligent bookmarks within both live and recorded content proactively and/or on demand, and to proactively create user-specific collections of DVR-generated viewing wish lists based on analyses of the programming's actual content (thus extending capabilities for individual customization significantly beyond services based primarily on existing metadata and EPG-based information) and adding them to each user's account profile.

Furthermore, the capabilities described herein also make it possible to introduce multiple new and enhanced DVR services such as introducing the possibility for DVRs to automatically make adjustments to previously selected programmatic recording times when something causes an unforeseen delay or time extension (such as a rain delay or unexpectedly brief boxing match). This would be accomplished by directly analyzing the stream's visual and auditory content and adjusting recording times accordingly. Another example of enhanced DVR services based on this disclosure would be the creation of enhanced "intelligent seek" navigation and the automatic creation of user-specific content wish lists.

This disclosure builds upon several building blocks which are combined in a new way. MPEG-7 metadata streams are used for multiplexing either AI image recognition models or image classification data (bounding box coordinates, classifier, AI model owner, time stamp and more). AI models are used for image classification. This can be any image classification model, but examples are Tensorflow, Tensorflow Lite, ONNX and similar. The disclosure is open for any future image recognition technology—it is not dependent on any specific software or hardware technology in this sense. The image classification model is working on video image content.

Lightweight computing platforms for image classification may run on the client/consumer side or server-side computing platform for image classification. The bounding box coordinates, classifier, AI model owner, time stamp and more may be sent over the MPEG-7 metadata channel or as an out-of-band data channel to the client. This disclosure is not only limited to video contents—AI powered object classifiers can also work on audio and other types of data (sensor data, meta data of other types).

It is well known that DVRs primarily sync with digital TV listings and that these devices and video services routinely allow users to modify or adjust their recording settings so that the recordings can start and end at the times of their choice. Auto-extend features are known in the literature. However, the implementation of feature simply extends by x-minutes the recording end time for specific programs (e.g., sport games) if the event runs beyond the originally scheduled end time. However, this is a programmatic feature and is not based on a direct analysis of the stream's real-time content itself.

By contrast, this disclosure's DVR-focused enhancements all stem from the fact that each of these enhanced services and capabilities originate from direct AI/ML analysis of each individual stream's content in order to: detect changes to the event's programming which would require modifying a recording's planned start and end times; identify highly relevant user-specific objects (people/objects/products) and events (explosions/crowd reactions) to anchor "intelligent seeking" and "intelligent bookmarking" services on a per-stream and per-user basis; and create user-specific collections of programming wish lists for future viewing.

In some embodiments, AI-classification model(s) are used for video and/or image analysis. For example, two viewers may be watching the same video. Each viewer has different interests and downloads different adaptation sets with metadata based on their profile information. When objects of each viewer's interest are detected, each respective viewer can obtain more information on objects of interest to them. All detection is done in real time, so no preprocessing is necessary. This means that the detection can be done for broadcast or live-streamed content and still reflect each viewer's personal interests.

AI-classification models may also be used for audio analysis and are not necessarily limited to audio associated with video content. This disclosure's dynamic structures for combining and chaining AI models can also be employed for analyzing and classifying auditory elements. This has the potential to create compelling new information products, services, and capabilities that do not yet exist. For example, if a user hears the special tones of a sonically branded product (e.g., a newly released smart phone), they could receive a discount if they react within a second or two. This means that object recognition is not only tied to images and videos, and detection can work for products/promotions outside of traditional video streams and perhaps only a few individual users can hear. Since this disclosure provides automatic URL-linking, it is therefore quite straightforward to automatically create a large number of highly specialized campaigns for products and services unlocked via unique combinations of ongoing video viewership, individual behaviors, auditory signaling, object interaction, etc. all at once.

Multiple AI models can be chained together. This enables multiple vendors to co-exist and/or compete for the viewer's attention on the same platform and over the same media services. Static mappings may exist between objects and URLs. Competing bids by multiple AI models can change the mapping dynamically.

The possibilities of creating special campaigns or access to limited products for active viewers are endless here. Campaigns or limited deals can be created so that a viewer must have seen the product on screen or heard the song/tone/voice related to the product in order to get to the website to order the product or get more information or get in queue for limited editions.

The data streams that either carries AI model updates or metadata from the image recognition can be implemented in many different ways, such as multiplexed into a broadcast stream, MPEG-7 streams as separate adaptation sets, or MPEG-DASH adaptation sets. By using separate adaption sets, multiple metadata streams can be provided to all viewers, but only the interesting ones are downloaded to each viewer. The selection of adaption sets can be based on areas of interest, cookies, viewer profile data, social media contents etc. Separate meta data streams, multiple streams, can be downloaded in parallel to each viewer. The same stream can also be shared among multiple AI models.

In one embodiment the scheduled recording is automatically extended if it runs over scheduled time. The extension of the show, sports game, etc. is detected by using a trained ML model provided by the programmer/service provider. For example, sports-focused channel could provide video classifier models that are trained to recognize football games, soccer, tennis, F1, etc. One straightforward implementation of this would be to use models trained to recognize the relatively static graphical overlays and company/brand/event logo types associated with each broadcast event and to extend the recording of each live broadcast so long as those graphical elements continue to appear in the video stream.

ML models can analyze recorded programs and crop them afterwards, if the beginning of the next program was recorded in whole or part. When the ML model classifier gives high uncertainty while recording, this embodiment can be used for post-processing in order to remove commercials in between programs and/or the beginning of the next show. The ML model could detect when the actual game/match is over and when interviews and after talks take place. The user could optionally set the recording to only record the game and skip the talk afterwards.

The concept of wish list recording is known in the literature. For example, a subscriber might wish to record a program that is not in the EPG (normally contains metadata for the next 2 weeks). Wish list recording enables subscribers to type the name of the program (e.g., movie name), and when that program becomes available, then it is automatically recorded. Similarly, the concept of attribute-based recording is known—e.g., record the series Games of Thrones, record new episodes, record all Seahawks games, record all movies starring Morgan Freeman, etc. However, such feature works if the name of the movie or wish list item is matched with the metadata in the EPG and is heavily dependent on the metadata of the content item (e.g., cast member listed). Metadata used by DVRs are basic and do not reflect the full context of the content. There might instances where the user wants to record popular comic book movies and superhero movies, but the subscriber might not want to list the movie names individually (e.g., Black panthers, Avengers: Endgame, Logan, Iron man, etc.) or the subscriber might not know the names (this could be a new genre for the viewers). The optimized/trained classifiers can be used by the DVR service to determine the movies to record on the subscriber's wish list. The user might like videos with certain look/feel as well, the wish list recording feature can add similar looking (and/or sounding) movies to the wish list. Language detection using the audio track(s) can be used in combination with the above features too. A user might be interested in French movies or movies in their mother tongue.

Traditional ad insertion workflows that rely on SCTE-104 and 35 are known in the literature. This includes decorating the baseband video feed with markers and then compressing the feed to produce a compressed bitstream. A splicer is used to read the markers and splice replacement ads (e.g., done by affiliates) in the transport stream. This is done to present local ads as opposed to national ads.

There might be laws that prevent recording the content without the ads for some broadcasts or all (depends on the country). Therefore, this information needs to be provided to the DVR service (whether recording is done locally on user equipment or in the cloud). This would allow the DVR to determine if such pause/resume recording is supported/authorized for any particular program. Additionally, this special tag can be included in the bitstream as well as in the EPG. DVRs rely on EPGs metadata to start or stop a recording, auto-extend, etc.

The optimized model can then be used to detect start/end of ads and enable/disable recording. Since the DVR might create separate files every time a recording is paused or stopped, we need to play the recording in sequential order (i.e., playlist). The main content can be buffered. Buffering stops when an ad is detected and resumed when the ad ends. Then the content of the whole buffer can be permanently stored when the program ends or in response to a channel change. If such manipulation is not allowed (based on laws), then the detection of the beginning/end of an ad is marked to enable skips (either manual or automatic).

In an example, the model is based on the channel/metadata associated with a current program that is being broadcasted. Animal Planet channel might load their own model that allows viewers to learn about animals while ESPN might load a model to allow users to inquire about players or actions in the game as they occur (e.g., "What is pass interference?"). Each model may be delivered in response to channel change. For OTT services, selected movies/programs can activate the ML model for the program. For multicast services, an IGMP Membership Report (join message) sent by a user's device (TV, set top box, computer, mobile etc.) for the corresponding group can also trigger activation of the corresponding ML model.

The DVR service can allow user to record portions of a program. For example, a user might be interested in only parts of a late-night show (monologue and musical portion). If such program supports portion-of-interest recordings, the DVR service may allow the user to specify such criteria based on the parts that the user can record (e.g., "Record monologue and guest interviews"). One of the embodiments will be the loading of the appropriate ML model(s) by the DVR service based on the criteria associated with the requested recording. This personalized recording is typically combined with ML model chaining. Chaining multiple ML-models can be done in order to detect multiple classifications. Service provider ML models can be combined with wish list ML models in this way, as an example.

The ML models can also work on audio. This can be either an alternative method or a complement to video ML analysis. Audio can effectively be used in commercial detection and also as a way to detect end of shows/sports games.

A common object recognition function can also be created, where it does not matter where the video came from. The object recognition model is being run for all video services, channels and broadcast TV. The introduction of "intelligent seek" capabilities whereby end-users could request to seek forwards or backwards within the video stream until the requested conditions are met. For example, a user may say "show me the next time Wayne Rooney re-enters the football game", or "fast-forward to the end of the rain delay". The introduction of "intelligent bookmarking" capabilities whereby the DVR could proactively analyze stored and ongoing video streams in order to identify likely moments of interest for each active user of the platform, based on all known information regarding each user's current interests and past behaviors (e.g., "Golden Buzzer moments", or "High-Action moments based on crowd response" during sporting events).

Systems and methods are described herein for enhancing digital video recording services. A media stream is accessed, and a classification model is selected for identifying objects in the media stream. Using the classification model, it is determined whether a content item of interest to the user is currently being received in the media stream. If the content item is currently being received in the media stream, at least a portion of the content item is recorded from the media stream. If the content item is not currently being received, then recording is paused or delayed until it is determined that the content item is being received.

To determine whether a content item of interest to the user is currently being received in the media stream, a classification model may be used to identify objects in the media stream. It may then be determined, based on the identified objects, whether the content item is being received. For example, objects in the media stream may include a football, football players, and goal posts. If the content item is a football game, then the identification of these objects in the media stream indicates that the content item is being received. If, however, the media stream contains no items related to a football game, the content item is not being received.

In some embodiments, the media stream is monitored while the content item is being recorded. Based on the monitoring, it may be determined whether the content item is still currently being received in the media stream. If the content is not currently being received, recording of content from the media stream is paused. Monitoring of the media stream continues and if the content item is again received in the media stream, recording is resumed.

The classification model may also be used to determine whether a current portion of the content item is of interest to the user. For example, the user may be interested in the monologue portion of a late-night talk show. The classification model may be used to determine whether the current portion of the content item is part of the monologue. If the current portion is of interest to the user, then the current portion is recorded. If the current portion is not of interest to the user then recording is paused.

If may take some time between receipt of a particular portion of a content item and a determination, based on the classification model, that the portion should be recorded. A portion of the media stream may therefore be buffered. If a determination is made that the portion of the content item should be recorded, any part of the portion may be recorded from the buffer.

Determining whether a content item is of interest to the user may be accomplished in several ways. For example, if a content item is scheduled to be recorded, the content item may be determined to be of interest to the user. In another example, a content consumption history of the user may be used to identify one or more objects that are included in content frequently consumed by the user. An appropriate classification model may be used to determine if any of the identified objects are present in the media stream. If so, the content item in which they are present is determined to be of interest to the user.

During playback of a recorded content item, a request to navigate through the content item may be received. The request may be a text input or voice command from the user indicating a particular object, entity, or action within the content item. Based on this, a classification model is selected and used to process the recorded content item. A playback position matching the request may be identified. If so, the content item is played back beginning at the identified playback position. In some embodiments, one or more classification models may identify playback points of interest based on a classification model and a content consumptions history of the used. These playback positions may be bookmarked for later access by the user.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and should not be considered limiting of the breadth, scope, or applicability of these concepts. It should be noted that for clarity and ease of illustration, these drawings are not necessarily made to scale.

DETAILED DESCRIPTION

Figure 1:
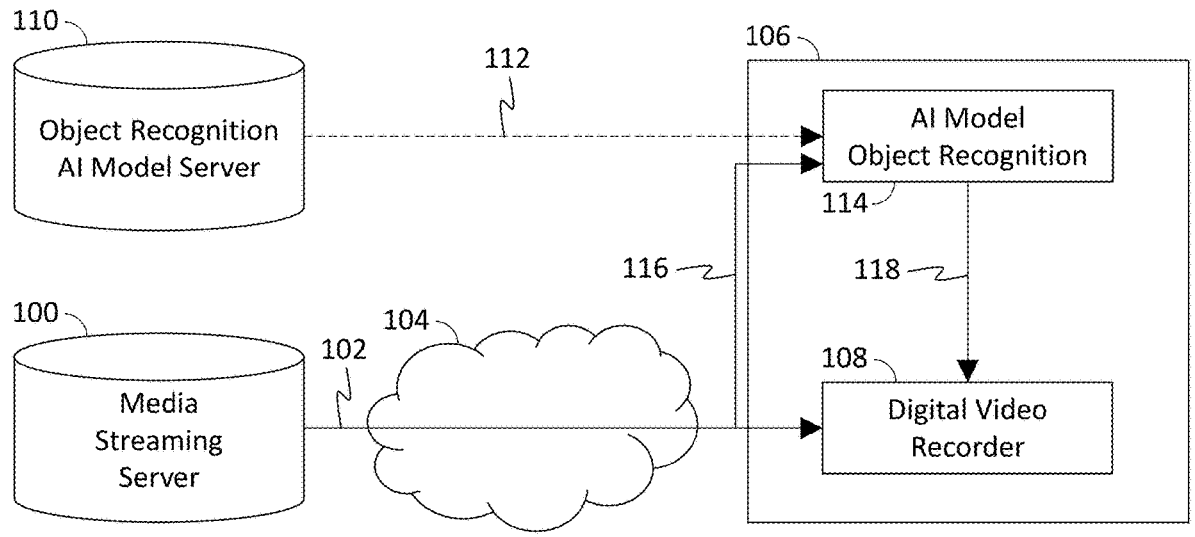
FIG. 1 shows media and object recognition models delivered to a user device at which a content item is to be recorded, in accordance with some embodiments of the disclosure.

FIG. 1 shows media and object recognition models delivered to a user device at which a content item is to be recorded, in accordance with some embodiments of the disclosure. Media streaming server 100 transmits 102 a media stream, via network 104, to user device 106. User device 106 may be any device capable of recording the media stream for later consumption by a user. As used herein, recording may refer to any digital storage of media data. For example, user device 106 may include DVR 108. User device 106 may also use AI/ML classification models to identify objects in the media stream. Object recognition AI model server 110 may transmit 112 one or more classification models to user device 106. User device 106 may include an AI model object recognition module 114. The media stream is fed 116 into AI model object recognition module 114. When AI model object recognition module 114 recognizes an object corresponding to a content item of interest to the user, it may cause 118 DVR 108 to record the content item from the media stream.

Figure 2:
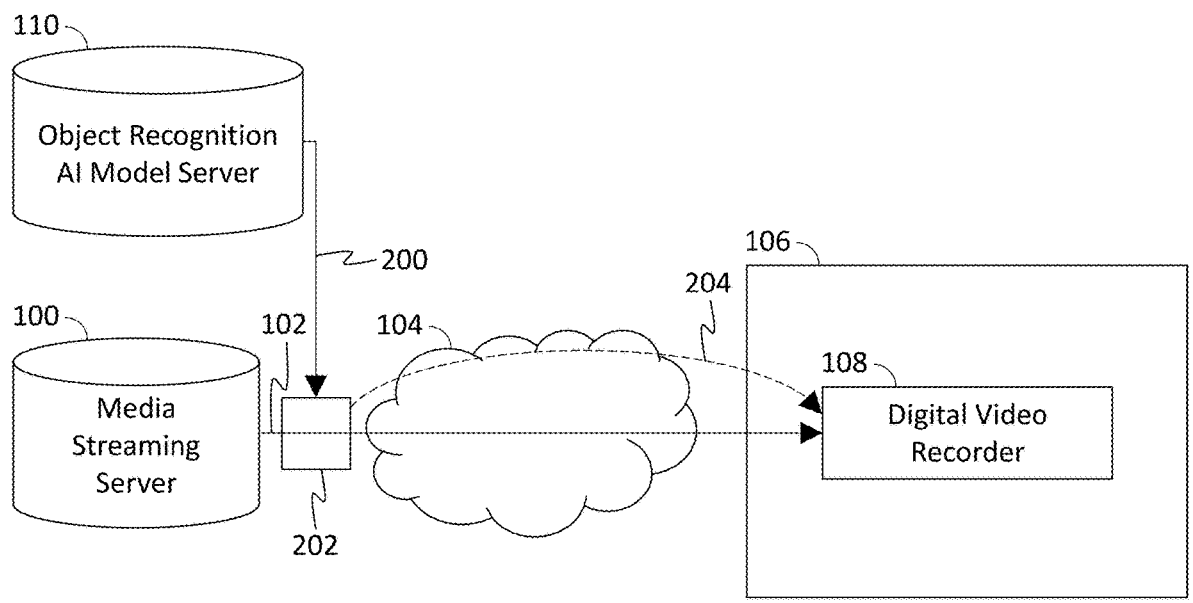
FIG. 2 shows media and metadata describing identified objects within the media delivered to a user device at which a content item is to be recorded, in accordance with some embodiments of the disclosure.

FIG. 2 shows media and metadata describing identified objects within the media delivered to a user device at which a content item is to be recorded, in accordance with some embodiments of the disclosure. Similar to the embodiment described above in connection with FIG. 1, media streaming server 100 transmits 102 a media stream, via network 104, to user device 106 which records a content item from the media stream using DVR 108. In this embodiment, however, the AI model object recognition module is not located at user device 106. Instead, object recognition AI model server 110 transmits 200 one or more classification models to a server-side AI model object recognition module 202. Metadata and/or notifications of identified objects are then transmitted 204 to user device 106, causing user device 106 to begin, pause, resume, or end recording of the content item from the media stream.

Figure 3:
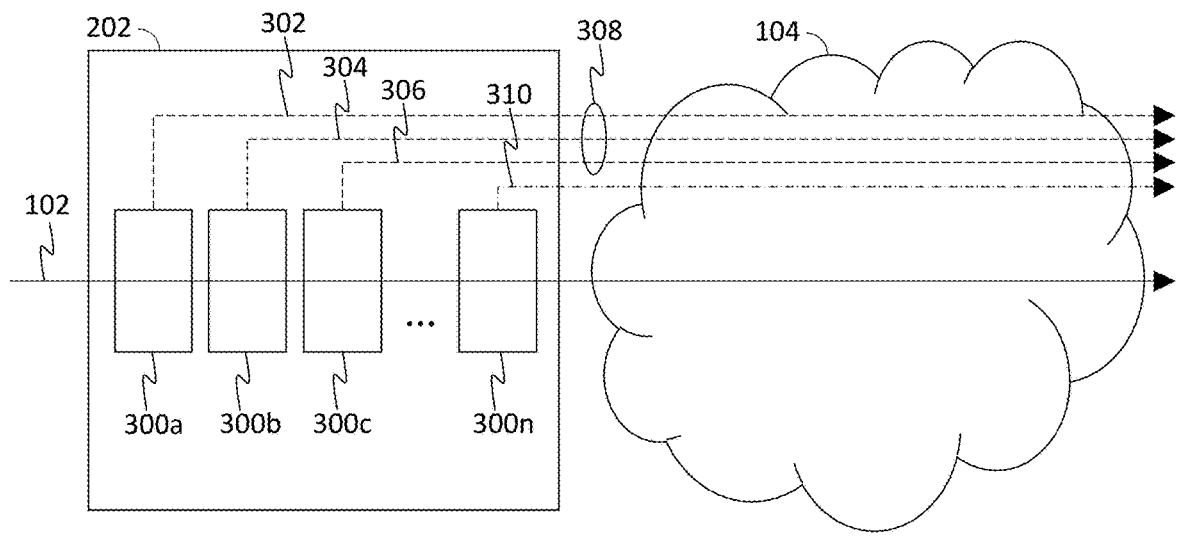
FIG. 3 shows media and metadata from multiple object recognition models describing identified objects within the media delivered to a user device at which a content item is to be recorded, in accordance with some embodiments of the disclosure.

FIG. 3 shows media and metadata from multiple object recognition models describing identified objects within the media delivered to a user device at which a content item is to be recorded, in accordance with some embodiments of the disclosure. Similar to the embodiment of FIG. 2, media stream 102 is processed by server-side AI model object recognition module 202. Multiple AI classification models 300a-300n may be used, concurrently or serially, to identify objects in the media stream. Control instructions for recording the content time from the media stream are then transmitted to user device 106 via network 104.

Figure 4:
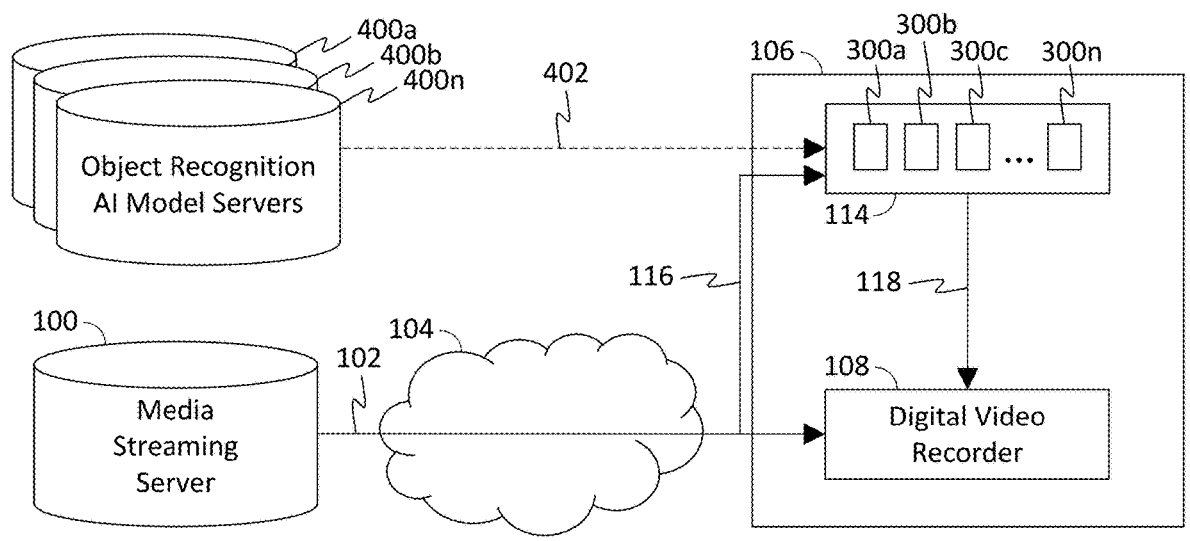
FIG. 4 shows media and multiple object recognition models delivered to a user device at which a content item is to be recorded, in accordance with some embodiments of the disclosure.

FIG. 4 shows media and multiple object recognition models delivered to a user device at which a content item is to be recorded, in accordance with some embodiments of the disclosure. In this embodiment, media streaming server 100 transmits 102 a media stream via network 104 to user device 106. User device 106 records a content item from the media stream using DVR 108. User device 106 includes AI model object recognition module 114. Multiple classification models from object recognition AI model servers 400a-400n are transmitted 402 to user device 106. The classification models 300a-300n are used by AI model object recognition module 114 to identify objects in the media stream, which is also fed 116 to AI model object recognition module 114. When AI model object recognition module 114 recognizes an object, it may cause 118 DVR 108 to pause, resume, or end the recording of the content item from the media stream.

Figure 5:
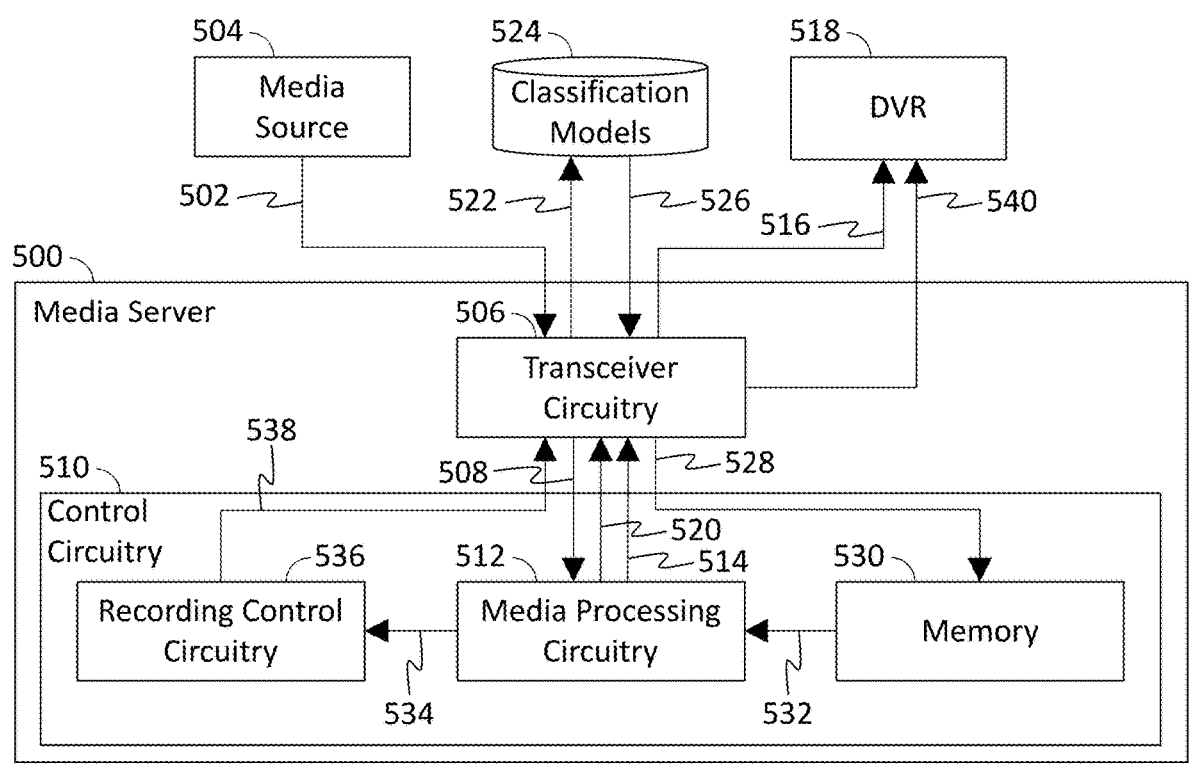
FIG. 5 is a block diagram showing components and dataflow therebetween of a media server at which a content item is to be recorded, in accordance with some embodiments of the disclosure.

FIG. 5 is a block diagram showing components and dataflow therebetween of a media server at which a content item is to be recorded, in accordance with some embodiments of the disclosure. Media server 500 receives 502 media data from media source 504. Media source 504 may be a media storage device, a live media ingest server, a broadcast media receiver, a multicast media receiver, a unicast media receiver, or any other suitable device for providing media data for streaming to client devices. Media server 500 receives the media data using transceiver circuitry 506. Transceiver circuitry 506 may comprise a network connection over which data can be transmitted to and received from remote devices, such as an Ethernet connection, Wi-Fi connection, mobile broadband interface, or connection employing any other suitable network protocol. Transceiver circuitry 506 may also include a cable television tuner or other connection suitable for receiving broadcast media and VOD content from a cable headend.

Transceiver circuitry 506 transmits 508 the media stream to control circuitry 510, where it is received using media processing circuitry 512. Control circuitry 510 may be based on any suitable processing circuitry and comprises control circuitry and memory circuitry, which may be disposed on a single integrated circuit or may be discrete components. As referred to herein, processing circuitry should be understood to mean circuitry based on one or more microprocessors, microcontrollers, digital signal processors, programmable logic devices, filed-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor).

Media processing circuitry 512 processes the media stream for output to a user device. For example, media processing circuitry 512 may decode audio and/or video data from the media stream and reencode it into a format suitable for streaming. Media processing circuitry 512 then transmits 514 the media stream to transceiver circuitry 506, which in turn transmits 516 the media stream to DVR 518 where it is recorded for later consumption by a user. DVR 518 may be located at a user device or may be a cloud-based recording system.

Media processing circuitry 512 identifies a type of the media content and transmits 520 a request for appropriate classification models to transceiver circuitry 506. Transceiver circuitry 506 transmits 522 the request to classification models database 524. Classification models database 524 may be located in a memory of media server 500, or may be located in one or more remote servers. Classification models database 524 transmits 526 the requested classification models to media server 500. Transceiver circuitry 506 receives the classification models and transmits 528 the classification models to memory 530. Memory 530 may be any suitable electronic storage device such as random-access memory, read-only memory, hard drives, optical drives, solid state devices, quantum storage devices, or any other suitable fixed or removable storage devices, and/or any combination of the same. The classification models may be stored in memory 530 for later use or may be stored temporarily while the media stream is being transmitted to DVR 518.

Memory 530 transmits 532 the classification models to media processing circuitry 512. Media processing circuitry 512 uses the classification models to identify objects within the media stream. As used herein, objects may include people, characters, inanimate objects, sounds, music, or any other discrete entity within the media stream. Metadata describing each identified object is then transmitted 534 to recording control circuitry 536. The metadata describing an identified object may include an identifier of the object, a playback position within the media stream at which the object appears. Recording control circuitry 536 compares the identified objects with the content item of interest to the user to determine if the content item of interest is currently being received in the media stream. Based on this determination, recording control circuitry 536 encodes a control, command, or instruction for transmission to DVR 518 in an out-of-band channel on a cable TV distribution network, as a data packet for transmission over an IP network, as a data stream multiplexed with the media stream, as part of an MPEG-7 metadata stream, or any other suitable format. Recording control circuitry 536 then transmits 538 the control, command, or instruction to transceiver circuitry 506, which in turn transmits 540 the control, command, or instructions to DVR 518.

Figure 6:
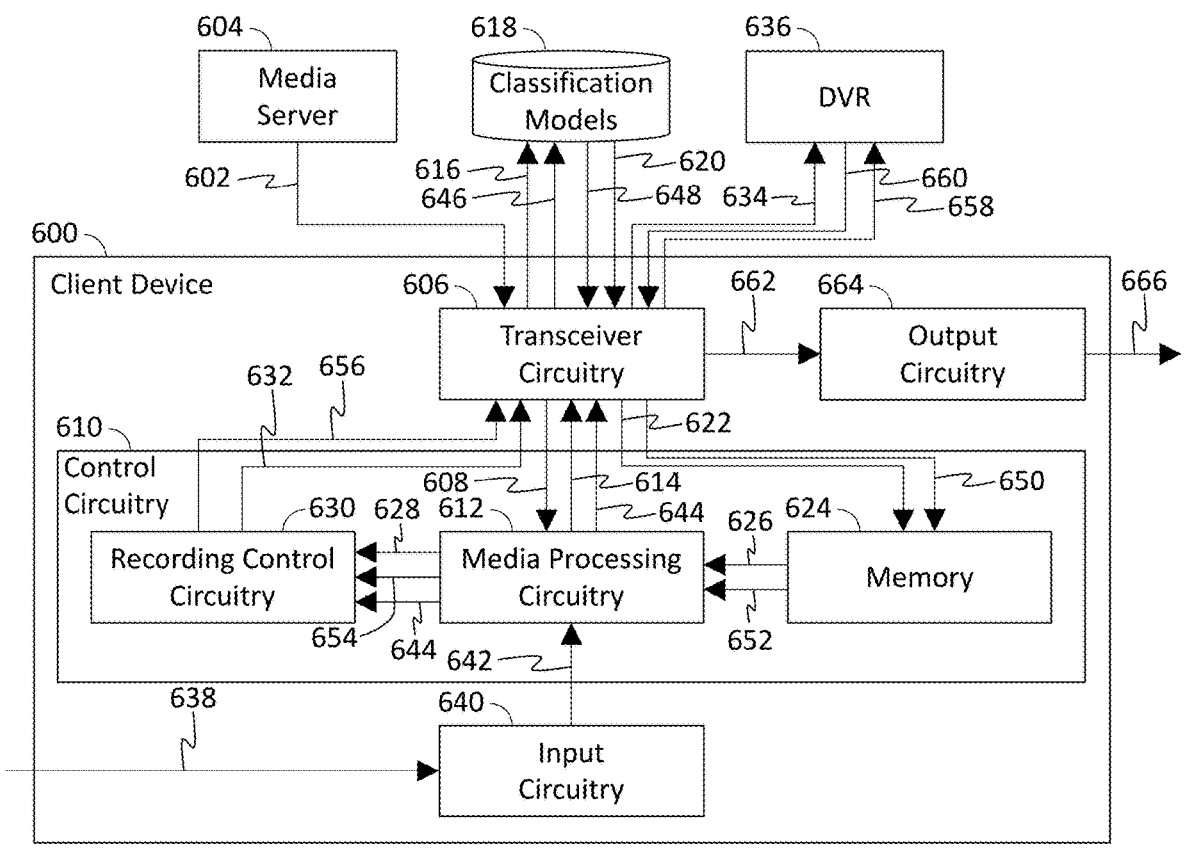
FIG. 6 is a block diagram showing components and dataflow therebetween of a user device at which a content item is to be recorded, in accordance with some embodiments of the disclosure.

FIG. 6 is a block diagram showing components and dataflow therebetween of a user device at which a content item is to be recorded, in accordance with some embodiments of the disclosure. Client device 600 receives 602 a media stream from media server 604. Media server 604 may be an instance of media server 500. Client device 600 receives the media stream using transceiver circuitry 606. Transceiver circuitry 506 may comprise a network connection over which data can be transmitted to and received from remote devices, such as an Ethernet connection, Wi-Fi connection, mobile broadband interface, or connection employing any other suitable network protocol. Transceiver circuitry 506 may also include a cable television tuner or other connection suitable for receiving broadcast media and VOD content from a cable headend.

Transceiver circuitry 606 transmits 608 the received media stream to control circuitry 610, where it is received using media processing circuitry 612. Control circuitry 610 may be based on any suitable processing circuitry and comprises control circuitry and memory circuitry, which may be disposed on a single integrated circuit or may be discrete components. As referred to herein, processing circuitry should be understood to mean circuitry based on one or more microprocessors, microcontrollers, digital signal processors, programmable logic devices, filed-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). Media processing circuitry 612 processes the media stream for output or recording. For example, media processing circuitry 612 may decode audio and/or video data from the media stream and use the decoded data to drive video and/or audio output devices accordingly.

Media processing circuitry 612 identifies a type of the media content and transmits 614 a request for appropriate classification models to transceiver circuitry 606. Transceiver circuitry 606 transmits 616 the request to classification models database 618. Classification models database 618 may be located in a memory of media server 600, or may be located in one or more other remote servers. Classification models database 618 transmits 620 the requested classification models to client device 600. Transceiver circuitry 606 receives the classification models and transmits 622 the classification models to memory 624. Memory 624 may be any suitable electronic storage device such as random-access memory, read-only memory, hard drives, optical drives, solid state devices, quantum storage devices, or any other suitable fixed or removable storage devices, and/or any combination of the same. The classification models may be stored in memory 624 for later use or may be stored temporarily while the media stream is being received.

Memory 624 transmits 626 the classification models to media processing circuitry 612. Media processing circuitry 612 uses the classification models to identify objects within the media stream. Media processing circuitry 612 then transmits 628 metadata describing each identified object to recording control circuitry 630. The metadata describing an identified object may include an identifier of the object and a playback position within the media stream at which the object appears. Recording control circuitry 630 compares the identified objects with the content item of interest to the user to determine if the content item of interest is currently being received in the media stream. Based on this determination, recording control circuitry 630 encodes a control, command, or instruction to begin, pause, resume, or end recording of the content item. Recording control circuitry 630 then transmits 632 the control, command, or instruction to transceiver circuitry 606, which in turn transmits 634 the control, command, or instruction to DVR 636. DVR 636 may be located within client device 600, on a local network to which client device 600 is connected (e.g., a whole-home DVR), or at a remote server.

Client device 600 may receive 638 an input from a user requesting to navigate through a recorded content item or to begin playback of the recorded content item. The input may include an indication of an object, entity, or action which the user is interested in. Input circuitry 640 may be a touch-screen, control panel, keyboard, other user interface device connected to, or integrated with, client device 600. Input circuitry 640 may also comprise a microphone or other suitable circuitry for receiving speech input from a user. In some embodiments, input circuitry 640 may be a wireless receiver that communicates with an external user interface device, such as a remote control or Bluetooth device. Input circuitry 640 may, in some embodiments, be incorporated into transceiver circuitry 606. Input circuitry 640 transmits 642 the user input to media processing circuitry 612. Based on the metadata related to the object with which the input is associated, media processing circuitry 612 transmits 644 a request for an appropriate classification model to transceiver circuitry 606. Transceiver circuitry 606 transmits 646 the request to classification models database 618 and receives 648 the requested classification model. Transceiver circuitry 606 then transmits 650 the classification model to memory 624, or directly to media processing circuitry 612.

Memory 624 transmits 652 the classification models to media processing circuitry 612. Media processing circuitry 612 uses the classification models to identify objects within the media stream. Media processing circuitry 612 then transmits 654 metadata describing each identified object to recording control circuitry 630. The metadata describing an identified object may include an identifier of the object and a playback position within the media stream at which the object appears. Recording control circuitry 630 then encodes a control, command, or instruction for DVR 636 to play back the content item beginning at the playback position. Recording control circuitry 630 transmits 656 the control, command, or instruction to transceiver circuitry 606 which in turn transmits 658 the control, command, or instruction to DVR 636.

In response to the control, command, or instruction, DVR 636 accesses the indicated playback position of the recorded content item and transmits 660 the content item from the indicated playback position to transceiver circuitry 606. Transceiver circuitry 606 then transmits 662 the received content to output circuitry 664. Output circuitry 664 may be any suitable circuitry for driving output of audio and/or video content. Output circuitry 664 then outputs 666 the received content for consumption by the user.

Figure 7:
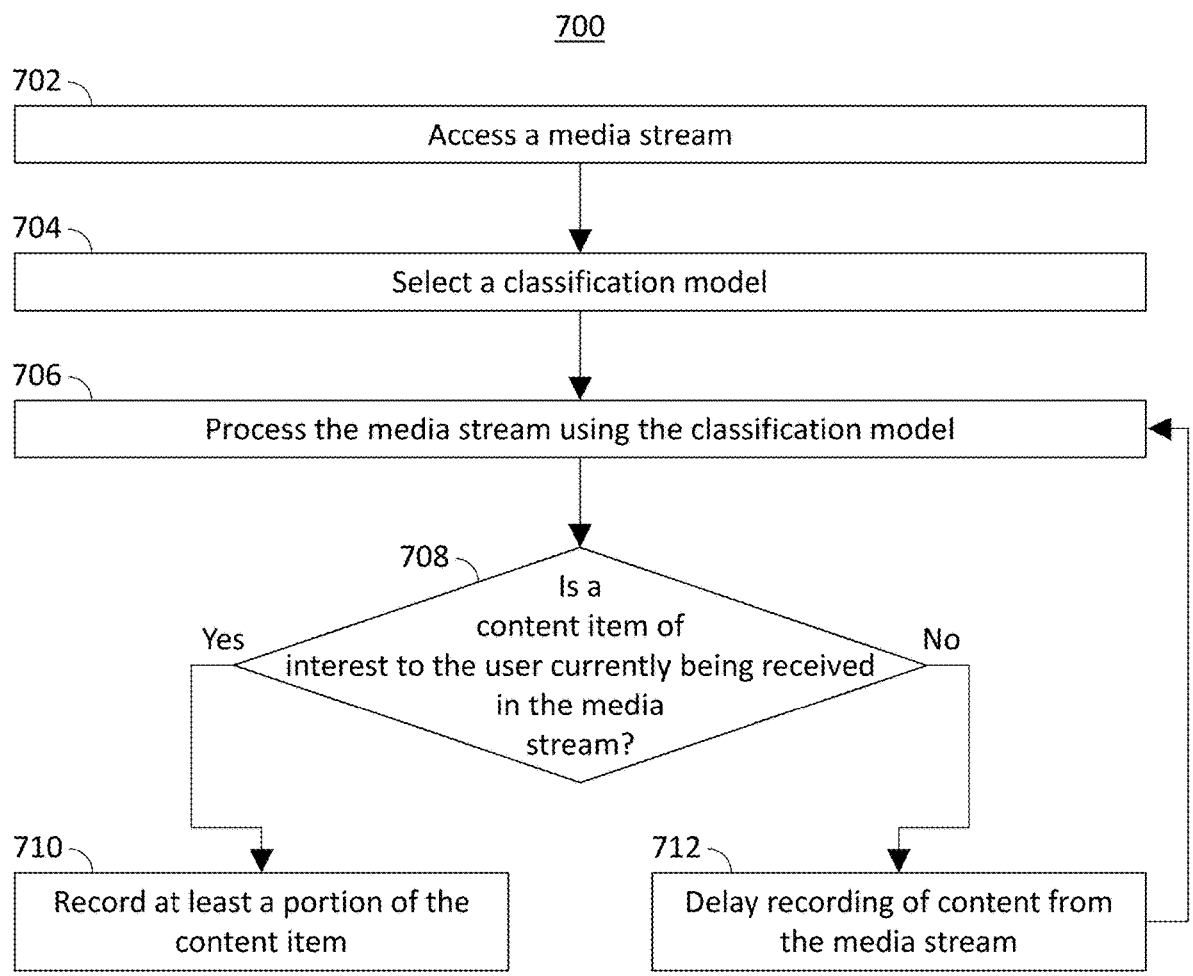
FIG. 7 is a flowchart representing an illustrative process for controlling recording of a content item based on objects detected in a media stream, in accordance with some embodiments of the disclosure.

FIG. 7 is a flowchart representing an illustrative process 700 for controlling recording of a content item based on objects detected in a media stream, in accordance with some embodiments of the disclosure. Process 700 may be implemented on control circuitry 510 or control circuitry 610. In addition, one or more actions of process 700 may be incorporated into or combined with one or more actions of any other process or embodiment described herein.

At 702, the control circuitry accesses a media stream. When executed at a media server, control circuitry 510 of media server 500 may access a media source (e.g., media source 504) from which media assets are available. Control circuitry 510 may receive a request for specific media asset from a user device (e.g., client device 600) and access a media source from which the requested media asset is available. When executed at a client device, control circuitry 610 of client device 600 transmits a request for a media asset to a media server or configures a tuner to receive a media stream from a specific over-the-air broadcast channel or cable TV channel.

At 704, the control circuitry selects a classification model. Classification models may be chosen based on the type of content with which the media stream is associated. For example, a classification model optimized for identification of fictional spacecraft may be selected for a science fiction media asset, while a classification model optimized for identification of football players may be chosen for a live stream of a football game. Classification models may also be chosen based on user preferences. For example, a user may have an interest in cars. Accordingly, a classification model optimized for identification of cars may be selected.

At 706, the control circuitry processes the media stream using the selected classification model. This may be accomplished using any known media processing techniques, including audio matching, image recognition, character recognition, speech recognition, or any other suitable processing technique. At 708, the control circuitry determines, based on the processing, whether a content item of interest to the user is currently being received in the media stream. For example, content items scheduled for recording can be used to identify content of interest to the user. As another example, user preferences, content consumption history, internet search history, and other user data may be used to predict what content items or types of content items the user is interested in. For example, if the user watches a lot of football games, or regularly visits webpages relates to football, the control circuitry may determine that the user is interested in football. The control circuitry may then compare objects identified in the media stream, which may include one or more content items multiplexed together, with a set of objects related to the user's interest (e.g., football). If the media stream is a multiplex, the control circuitry may determine if the detected objects are within the same content item or different content items within the media stream.

If a content item of interest to the user is currently being received in the media stream ("Yes" at 708), then, at 710, the control circuitry records at least a portion of the content item. This may be accomplished through local storage at a user device, local storage at a media server, or cloud-based storage. The classification model may be used to monitor the media stream to determine when the content item is being received and when a different content item (e.g., a next schedule content item, an advertisement within the content item, etc.) is being received. Recording may be paused, resumed, and/or ended as appropriate. This may be accomplished using methods described below in connection with FIG. 9.

If no content items of interest are currently being received in the media stream ("No" at 708), then, at 712, the control circuitry delays recording of content from the media stream. For example, the media stream may be accessed in response to the start of a scheduled recording time. However, the content item desired by the user to be recorded may start late (e.g., the previous content item runs longer than expected). If, using the classification model, the control circuitry determines that the content item has not yet started, storage resources can be conserved by not recording content from the media stream until such time as it is determine that the desired content item is actually being received. Thus, after delaying recording, processing returns to 706 at which the control circuitry continues to process the media stream using the classification model.

The actions and descriptions of FIG. 7 may be used with any other embodiment of this disclosure. In addition, the actions and descriptions described in relation to FIG. 7 may be done in suitable alternative orders or in parallel to further the purposes of this disclosure.

Figure 8:
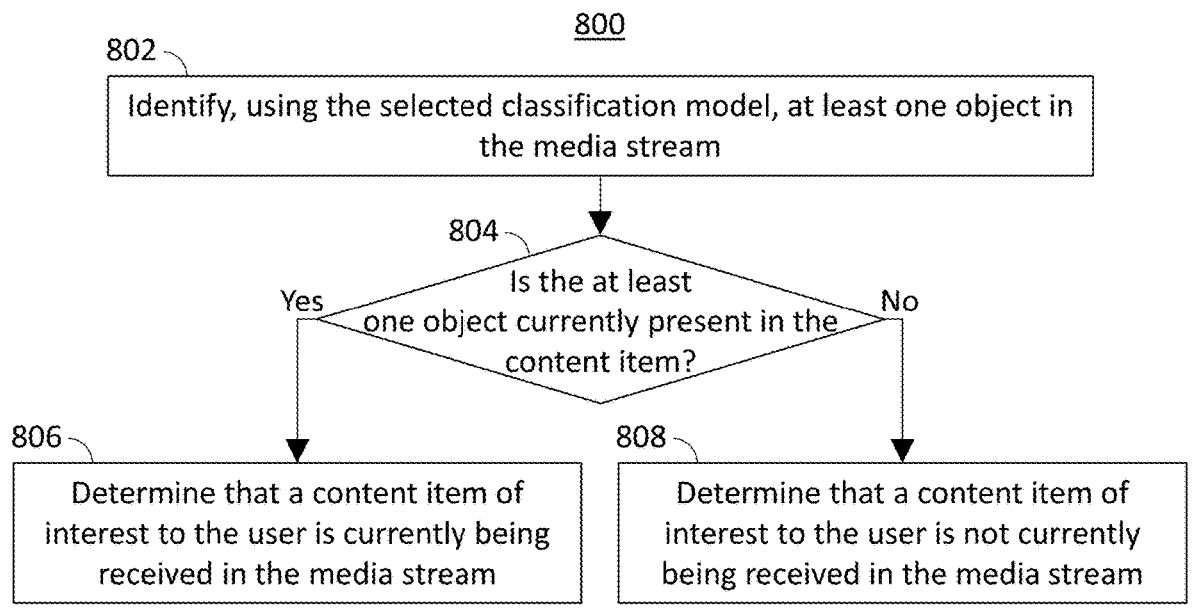
FIG. 8 is a flowchart representing an illustrative process for determining whether a content item of interest to the user is currently being received in a media stream, in accordance with some embodiments of the disclosure.

FIG. 8 is a flowchart representing an illustrative process 800 for determining whether a content item of interest to the user is currently being received in a media stream, in accordance with some embodiments of the disclosure. Process 800 may be implemented on control circuitry 510 or control circuitry 610. In addition, one or more actions of process 800 may be incorporated into or combined with one or more actions of any other process or embodiment described herein.

At 802, the control circuitry identifies, using the selected classification model, at least one object in the media stream. This may be accomplished using any known media processing techniques, including audio matching, image recognition, character recognition, speech recognition, or any other suitable processing technique. At 804, the control circuitry determines whether the at least one object is currently present in the content item. For example, the content item may be a live broadcast of a football game, multiplexed with other content items into a single media stream. The control circuitry may identify a football depicted in the content item using the classification model. As the content item continues to be received, the control circuitry may determine whether the content item currently depicts a football. If so ("Yes" at 804), then, at 806, the control circuitry determines that a content item of interest to the user is currently being received in the media stream. If not ("No" at 804), then, at 808, the control circuitry determines that a content item of interest to the user is not currently being received in the media stream. For example, broadcast of the football game may have ended. Similar processes may be used to determine if the content item has yet started. This may be useful when the content item does not align with its scheduled time. For example, broadcast of a football game may be scheduled to start at 1:00 pm and end at 4:00 pm. However, the kick-off may not occur until 1:10 pm. The game may also end earlier or later than 4:00 pm. Resources can therefore be conserved by recording only when the content item is actually being received.

The actions and descriptions of FIG. 8 may be used with any other embodiment of this disclosure. In addition, the actions and descriptions described in relation to FIG. 8 may be done in suitable alternative orders or in parallel to further the purposes of this disclosure.

Figure 9:
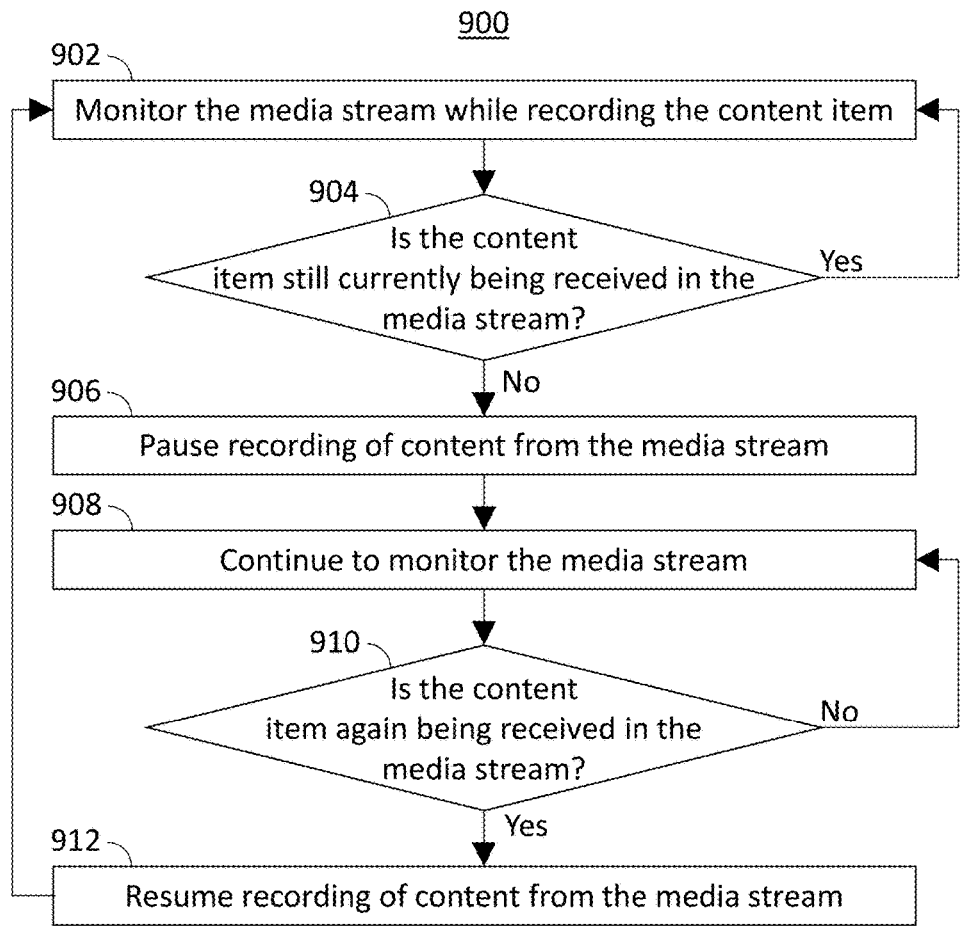
FIG. 9 is a flowchart representing an illustrative process for pausing recording of a content from a media stream when the desired content item is not being received and resuming recording when the desired content item is again being received, in accordance with some embodiments of the disclosure.

FIG. 9 is a flowchart representing an illustrative process 900 for pausing recording of a content from a media stream when the desired content item is not being received and resuming recording when the desired content item is again being received, in accordance with some embodiments of the disclosure. Process 900 may be implemented on control circuitry 510 or control circuitry 610. In addition, one or more actions of process 900 may be incorporated into or combined with one or more actions of any other process or embodiment described herein.

At 902, the control circuitry monitors the media stream while recording the content item. The control circuitry may continuously process the incoming media stream using the classification model while recording of the content item is in progress. At 904, the control circuitry determines whether the content item is still currently being received in the media stream. For example, using the classification model, the control circuitry may determine whether objects associated with the content item are currently present in the media stream. Objects associated with the content item may not be present in the media stream during advertisements or if the content item has ended.

If the content item is still being received in the media stream ("Yes" at 904), then processing returns to 902 at which the control circuitry continues to monitor the media stream. If the content item is not currently being received in the media stream ("No" at 904), then, at 906, the control circuitry pauses recording of content from the media stream. For example, the control circuitry may instruct a DVR or recording control circuitry to pause storage of media data from the media stream, or from a program within a multiplexed media stream that corresponds to the content item. At 908, the control circuitry continues to monitor the media stream.

At 910, based on the continued monitoring, the control circuitry determines whether the content item is again being received in the media stream. For example, objects associated with the content item may begin to appear again in the media stream. If the content item is still not being received ("No" at 910), then processing returns to 908 at which the control circuitry continues to monitor the media stream. If the content item is again being received in the media stream ("Yes" at 910), then, at 912, the control circuitry resumes recording of content from the media stream. For example, the control circuitry may instruct a DVR or recording control circuitry to resume storage of media data from the media stream, or from a program within a multiplexed media stream that corresponds to the content item. Processing then returns to 902 and this process repeats.

The actions and descriptions of FIG. 9 may be used with any other embodiment of this disclosure. In addition, the actions and descriptions described in relation to FIG. 9 may be done in suitable alternative orders or in parallel to further the purposes of this disclosure.

Figure 10:
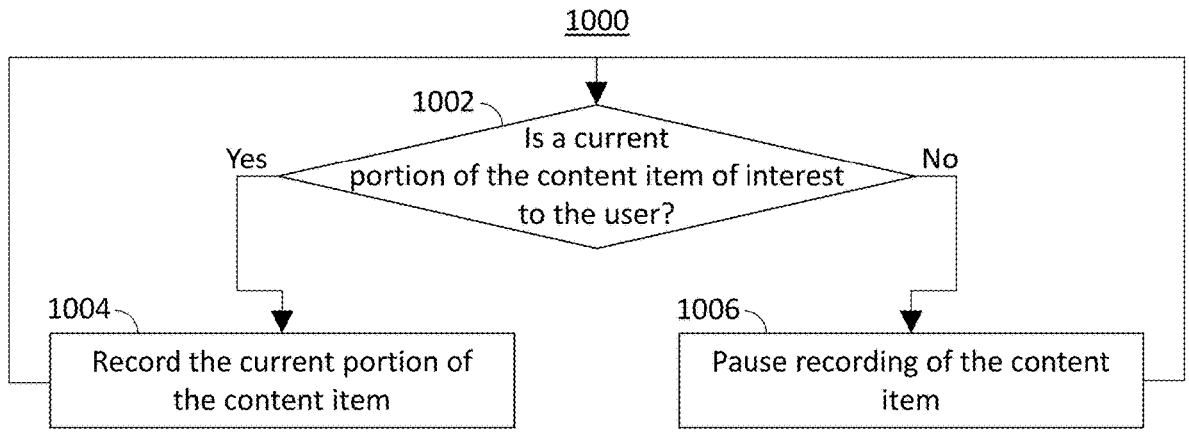
FIG. 10 is a flowchart representing an illustrative process for recording only portions of the content item that are of interest to the user, in accordance with some embodiments of the disclosure.

FIG. 10 is a flowchart representing an illustrative process 1000 for recording only portions of the content item that are of interest to the user, in accordance with some embodiments of the disclosure. Process 1000 may be implemented on control circuitry 510 or control circuitry 610. In addition, one or more actions of process 1000 may be incorporated into or combined with one or more actions of any other process or embodiment described herein.

At 1002, the control circuitry determines whether a current portion of the content item is of interest to the user. For example, user preferences, content consumption history, internet search history, and other user data may be used to predict which objects the user is interested in. The control circuitry then identifies objects in the content item using the classification model and compares the identified objects with the user data. If an object matching the user data is identified, then the current portion of the content item may be of interest to the user. For example, the user may prefer to watch only the monologue portion of a late-night talk show. The monologue portion of the show may feature a certain portion of the stage or theater from which the show is broadcast or may have particular audio patterns such as music or laughter. The classification model may be used to determine if the current portion of the content item comprises the monologue portion of the show.

If the current portion of the content item is of interest to the user ("Yes" at 1002), then, at 1004, the control circuitry records the current portion of the content item. Processing may then return to 1002. If the current portion of the content is not of interest to the user ("No" at 1002), then, at 1006, the control circuitry pauses recording of the content item. Processing may then return to 1002.

The actions and descriptions of FIG. 10 may be used with any other embodiment of this disclosure. In addition, the actions and descriptions described in relation to FIG. 10 may be done in suitable alternative orders or in parallel to further the purposes of this disclosure.

Figure 11:
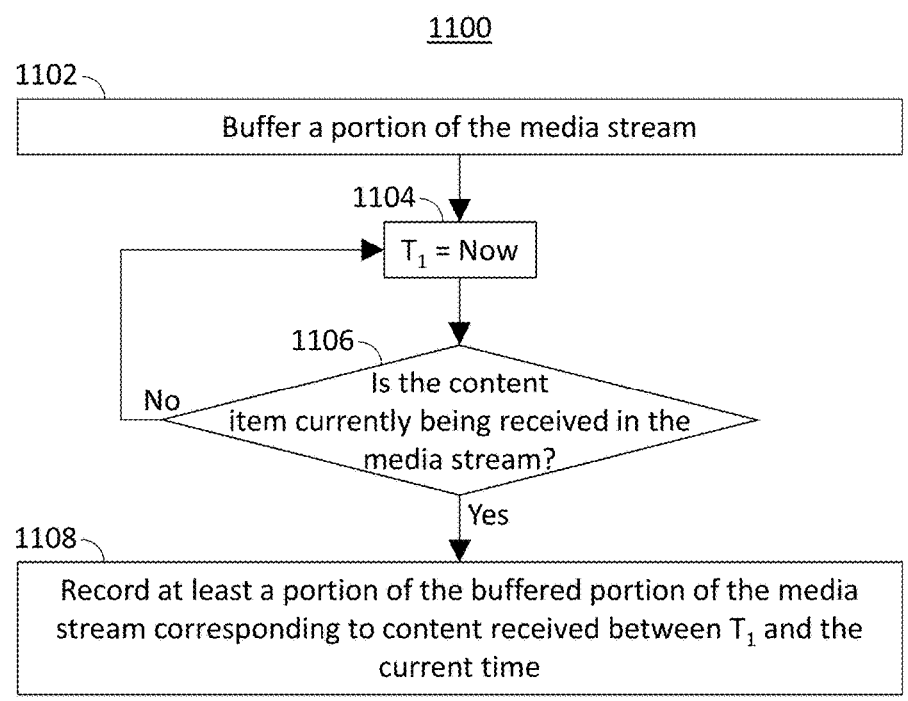
FIG. 11 is a flowchart representing an illustrative process for recording a buffered portion of the content item, in accordance with some embodiments of the disclosure.

FIG. 11 is a flowchart representing an illustrative process 1100 for recording a buffered portion of the content item, in accordance with some embodiments of the disclosure. Process 1100 may be implemented on control circuitry 510 or control circuitry 610. In addition, one or more actions of process 1100 may be incorporated into or combined with one or more actions of any other process or embodiment described herein.

At 1102, the control circuitry buffers a portion of the media stream. For example, the control circuitry may temporarily store the last 30 seconds of content from at least the content item to be recorded. At 1104, the control circuitry sets the value of a variable $T_1$ to a representing of the current time. Then, at 1106, the control circuitry determines if the content item is currently being received in the media stream. This may be accomplished using methods described above in connection with FIG. 9. If the content item is not currently being received in the media stream ("No" at 1106), then processing returns to 1104 at which the value of $T_1$ is reset to the now-current time.

If the content item is currently being received in the media stream ("Yes" at 1106), then, at 1108, the control circuitry records at least a portion of the buffered portion of the media stream corresponding to content received between $T_1$ and the current time. For example, the process of determining whether the content item is currently being received may take a small amount of time, from a few milliseconds up to 1 or 2 seconds, which would delay the start of recording of the content item. The control circuitry therefore compensates for this delay by recording from the buffer any part of the content item that was received between the time the determination process began and the time the determination was made that the content item is currently being received. This may be especially important for situations in which the user is only interested in small portions of the content item that contain fast-paced action. For example, the user may only be interested in watching the plays of a football game and not any part of the football game during which the are no plays on the field. Some football plays take only a few seconds from the time the quarterback throws the ball until the end of the play. A classification model that identifies football plays may be used in this scenario. However, any delay in recording each play would result in the user missing a significant amount of each play. Thus, the buffered content is used to compensate for any such delays.

The actions and descriptions of FIG. 11 may be used with any other embodiment of this disclosure. In addition, the actions and descriptions described in relation to FIG. 11 may be done in suitable alternative orders or in parallel to further the purposes of this disclosure.

Figure 12:
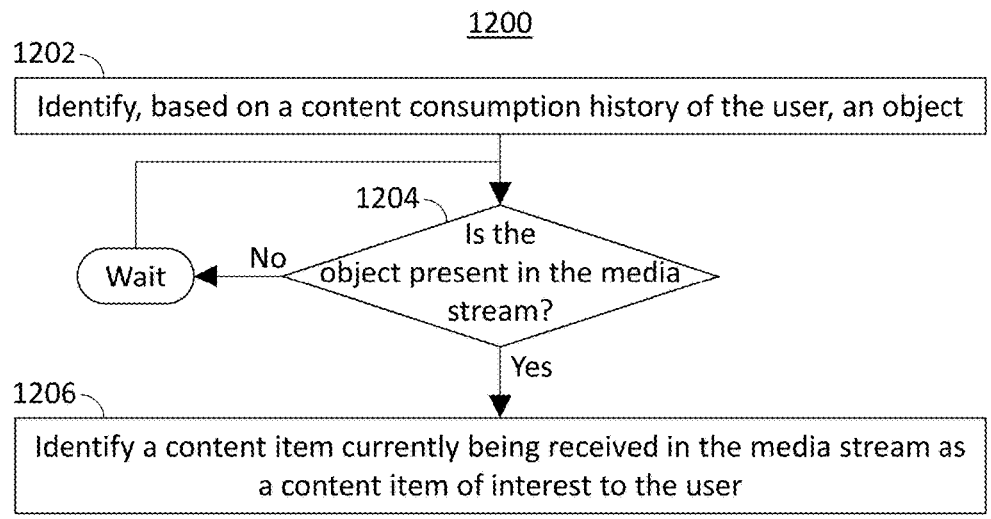
FIG. 12 is a flowchart representing an illustrative process for identifying a content item being received as a content item of interested to the user, in accordance with some embodiments of the disclosure.

FIG. 12 is a flowchart representing an illustrative process 1200 for identifying a content item being received as a content item of interested to the user, in accordance with some embodiments of the disclosure. Process 1200 may be implemented on control circuitry 510 or control circuitry 610. In addition, one or more actions of process 1200 may be incorporated into or combined with one or more actions of any other process or embodiment described herein.

At 1202, the control circuitry identifies, based on a content consumption history of the user, an object. For example, the control circuitry may access a user profile or other database of user information which includes a history of content items the user has consumed. The control circuitry may determine from the consumption history that the user has consumed a lot of science fiction content. In some implementations, the control circuitry may look at overall content consumption of the user. Alternatively, the control circuitry may look only at a recent subset of content consumption history data. For example, the user may have consumed a lot of science fiction content overall, but in the last 14 days the use has consumed more football content than any other type of content. The control circuitry may, in some embodiments, take an overall percentage for each content type and apply it as a weight or scale factor to a recent subset of content, or vice versa. The control circuitry may then determine a type of content that the user is most interested in consuming. The control circuitry identifies an object associated with that type of content based on classification models and/or previously identified objects of which the control circuitry may have stored indications.

At 1204, the control circuitry determines whether the object is present in the media stream. For example, the control circuitry may process the media stream using a classification model associated with or optimized for the type of content and identify objects within the media stream. The objects identified within the media stream are compared with the object identified based on the user's consumption history. If the same or similar object is not present within the media stream ("No" at 1204), then the control circuitry waits a predetermined amount of time (e.g., 1 minute, 5 minutes, or 30 minutes) before processing returns to 1204. If the same or similar object is present within the media stream ("Yes"

at 1204), then, at 1206, the control circuitry identifies a content item currently being received in the media stream, and in which the object is detected, as a content item of interest to the user.

The actions and descriptions of FIG. 12 may be used with any other embodiment of this disclosure. In addition, the actions and descriptions described in relation to FIG. 12 may be done in suitable alternative orders or in parallel to further the purposes of this disclosure.

Figure 13:
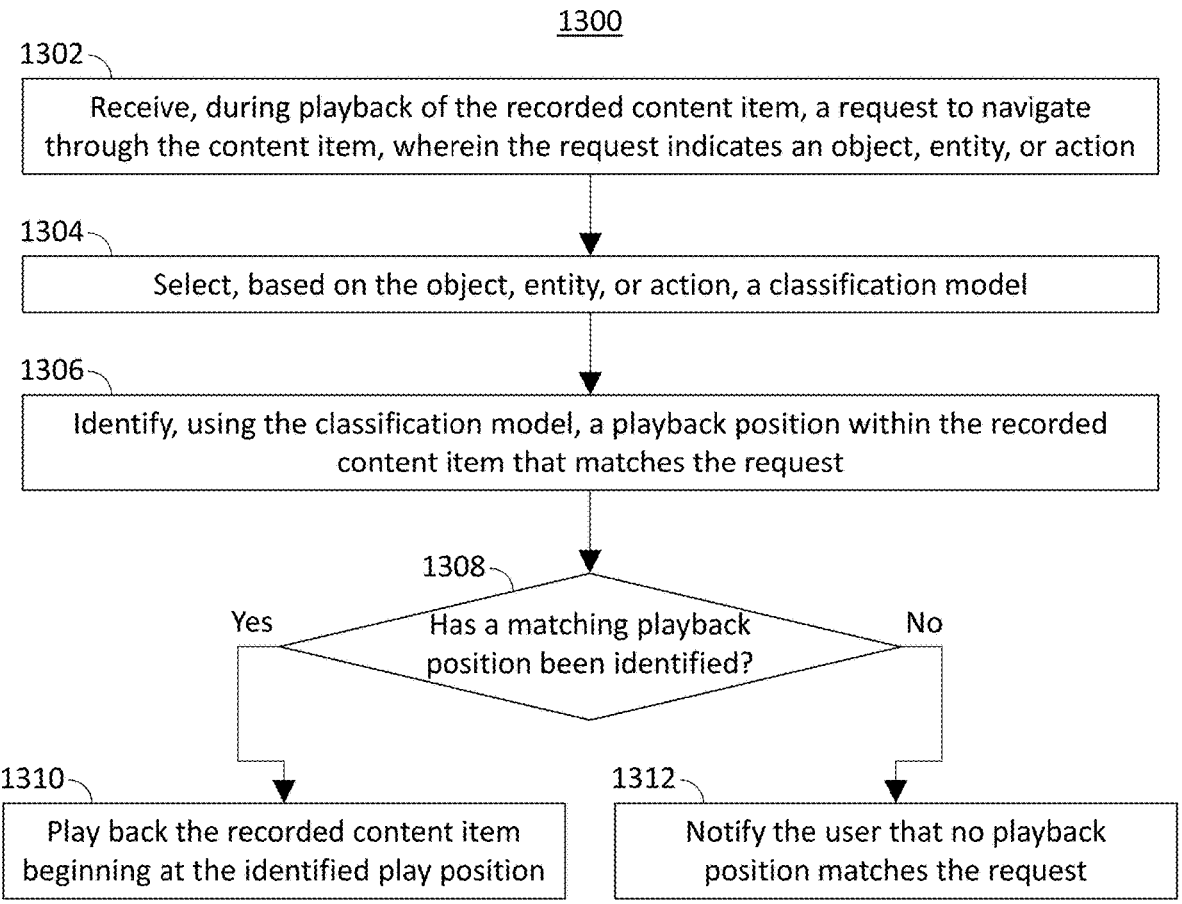
FIG. 13 is a flowchart representing an illustrative process for navigating through a recorded content item, in accordance with some embodiments of the disclosure.

FIG. 13 is a flowchart representing an illustrative process 1300 for navigating through a recorded content item, in accordance with some embodiments of the disclosure. Process 1300 may be implemented on control circuitry 510 or control circuitry 610. In addition, one or more actions of process 1300 may be incorporated into or combined with one or more actions of any other process or embodiment described herein.

At 1302, the control circuitry receives, during playback of the recorded content item, a request to navigate through the content item. The request indicates an object, entity, or action which the user is interested in. For example, the user may enter a text string or issue a voice command such as "Show me the winning touchdown" for a football game or "Skip to the monologue" for a late-night talk show. At 1304, the control circuitry selects, based on the object, entity, or action indicated in the request, a classification model. The control circuitry selects a classification model that is suitable for identifying the indicated object, entity, or action.

At 1306, the control circuitry identifies, using the classification model, a playback position within the recorded content item that matches the request. The control circuitry may process the recorded content item using the classification model to identify objects, entities, or actions that match that which was indicated in the request. If a match is found, the classification model may return the playback position at which the match was found. At 1308, the control circuitry determines whether a matching playback position has been identified. If so ("Yes" at 1308), then, at 1310, the control circuitry plays back the recorded content item beginning at the identified play position. In some embodiments, an ending playback position associated with the requested object, entity, or action may also be returned by the classification model. The control circuitry may then cause only the portion of the recorded content item between the matching playback position and the ending playback position to be played back. At the conclusion of such playback, the control circuitry may prompt the user to select an option to continue playback from the ending playback position, select a different playback position, or end playback of the content item. If no matching playback positions are found ("No" at 1308), then, at 1312, the control circuitry notifies the user that no playback positions match the request. The control circuitry may output an audio notification or may display a message or other visual notification on a display on which the recorded content item is being played back.

The actions and descriptions of FIG. 13 may be used with any other embodiment of this disclosure. In addition, the actions and descriptions described in relation to FIG. 13 may be done in suitable alternative orders or in parallel to further the purposes of this disclosure.

The processes described above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method for enhancing digital video recording services, the method comprising:
    accessing, at a client device, a media stream based on a start time of a scheduled recording of a content item;
    monitoring the media stream while recording the content item beginning at the scheduled start time;
    selecting a classification model;
    based at least in part on monitoring the media stream while recording the content item beginning at the scheduled start time, identifying, using the selected classification model, objects in the media stream while recording the content item;
    determining an identified object of a plurality of identified objects is of interest to a user;
    in response to determining the identified object of interest to the user of the plurality of identified objects is not currently being received in the media stream during the recording of the content item:
        pausing recording of the content item from the media stream;
        continuing to monitor the media stream while the recording of the content item from the media stream is paused; and
        in response to determining, based on the continued monitoring, that the identified object of interest to the user of the plurality of identified objects is again being received in the media stream, resuming recording of the content item from the media stream.

2. The method of claim 1, further comprising:
    determining, using the classification model, whether a current portion of the content item is of interest to the user;
    in response to determining that the current portion of the content item is of interest to the user, recording the current portion of the content item; and
    in response to determining that the current portion of the content item is not of interest to the user, pausing recording of the content item.

3. The method of claim 1, further comprising:
    buffering a portion of the media stream; and
    in response to determining that the content item is currently being received in the media stream, recording at least a portion of the buffered portion of the media stream corresponding to content received while the determining occurred.

4. The method of claim 1, further comprising determining whether the content item is of interest to the user.

5. The method of claim 4, wherein determining whether the content item is of interest to the user further comprises:
    identifying, based on a content consumption history of the user, an object;
    determining, using the classification model, whether the object is present in the media stream; and in response to determining that the object is present in the media stream, identifying a content item currently being received in the media stream as a content item of interest to the user.

6. The method of claim 1, further comprising:
receiving, during playback of the recorded content item, a request to navigate through the content item, wherein the request indicates an object, entity, or action;
selecting, based on the object, entity, or action indicated in the request, the classification model;
identifying, using the selected classification model, a playback position within the recorded content item that matches the request; and
playing back the recorded content item beginning at the identified playback position.

7. The method of claim 1, further comprising:
identifying, based on the classification model and a content consumption history of the user, playback points of interest to the user within the content item; and
generating a bookmark for each respective identified playback point of interest.

8. A system for enhancing digital video recording services, the system comprising:
input/output circuitry; and
control circuitry configured to:
    access, at a client device, a media stream based on a start time of a scheduled recording of a content item;
    monitor the media stream while recording the content item beginning at the scheduled start time;
    select a classification model;
    based at least in part on monitoring the media stream while recording the content item beginning at the scheduled start time, identify, using the selected classification model, objects in the media stream while recording the content item;
    determine an identified object of a plurality of identified objects is of interest to a user;
    in response to determining the identified object of interest to the user of the plurality of identified objects is not currently being received in the media stream during the recording of the content item:
        pause recording of the content item from the media stream;
        continue to monitor the media stream while the recording of the content item from the media stream is paused; and
        in response to determining, based on the continued monitoring, that the identified object of interest to the user of the plurality of identified objects is again being received in the media stream, resume recording of the content item from the media stream.

9. The system of claim 8, wherein the control circuitry is further configured to:
determine, using the classification model, whether a current portion of the content item is of interest to the user;
in response to determining that the current portion of the content item is of interest to the user, record the current portion of the content item; and
in response to determining that the current portion of the content item is not of interest to the user, pause recording of the content item.

10. The system of claim 8, wherein the control circuitry is further configured to:
buffer a portion of the media stream; and
in response to determining that the content item is currently being received in the media stream, record at least a portion of the buffered portion of the media stream corresponding to content received while the determining occurred.

11. The system of claim 8, wherein the control circuitry is further configured to determine whether the content item is of interest to the user.

12. The system of claim 11, wherein the control circuitry configured to determine whether the content item is of interest to the user is further configured to:
identify, based on a content consumption history of the user, an object;
determine, using the classification model, whether the object is present in the media stream; and
in response to determining that the object is present in the media stream, identify a content item currently being received in the media stream as a content item of interest to the user.

13. The system of claim 8, wherein the control circuitry is further configured to:
receive, during playback of the recorded content item, a request to navigate through the content item, wherein the request indicates an object, entity, or action;
select, based on the object, entity, or action indicated in the request, the classification model;
identify, using the selected classification model, a playback position within the recorded content item that matches the request; and
play back the recorded content item beginning at the identified playback position.

14. The system of claim 8, wherein the control circuitry is further configured to:
identify, based on the classification model and a content consumption history of the user, playback points of interest to the user within the content item; and
generate a bookmark for each respective identified playback point of interest.

* * * * *